J. REES.
Glass-Patterns.
No. 219,764. Patented Sept. 16, 1879.
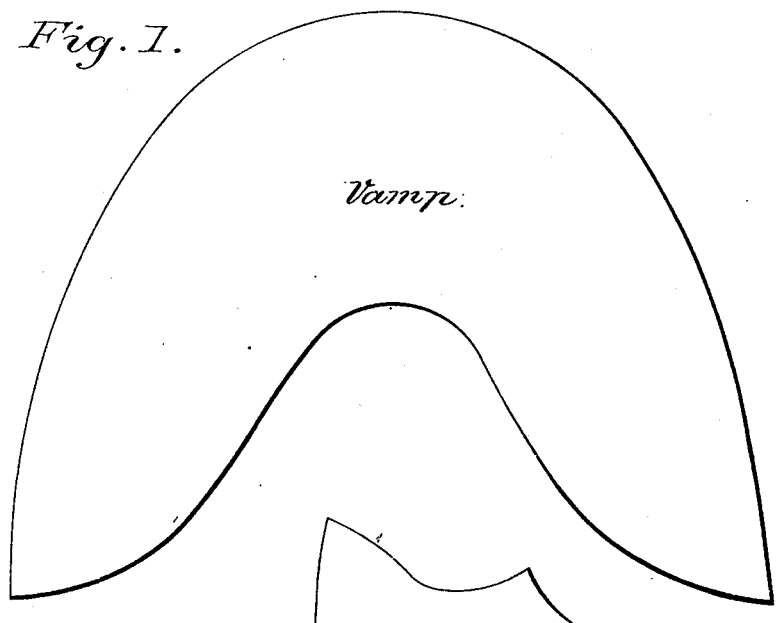
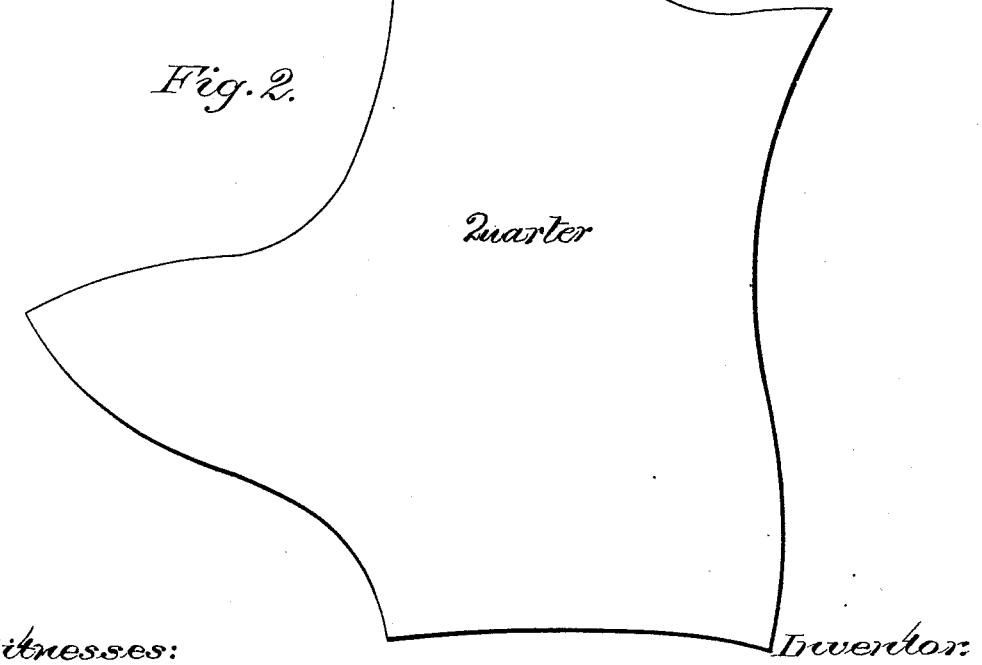

UNITED STATES PATENT OFFICE.

JOHN REES, OF COVINGTON, KENTUCKY, ASSIGNOR OF THIRTY-FIVE ONE-HUNDREDTHS PART OF HIS RIGHT TO JOHN W. BOUGHNER, OF SAME PLACE.

IMPROVEMENT IN GLASS PATTERNS.

Specification forming part of Letters Patent No. 219,764, dated September 16, 1879; application filed March 11, 1878.

*To all whom it may concern:*

Be it known that I, JOHN REES, of Covington, county of Kenton, State of Kentucky, have invented a new and useful Improvement in Glass Patterns, of which the following is a specification.

The invention relates to patterns made from glass, by which leather and other stuff, from which boots, shoes, and gloves are cut, such as vamps, quarters, and so forth, before being made up into finished goods. Heretofore those patterns have been made from stiff paper, iron, and brass-bound boards, &c.

The drawing represents a plan of the patterns, such as are used in the making of a pair of children's front-laced shoes.

My glass patterns can be made in any of the following ways: They can be cast in a cast-iron mold by means of a plunger or pressure; or the mold can be filled with a paddle, thereby giving but one surface, and the edges ground to a proper size by an emery or Scotch-granite grinding-wheel; or the patterns may be made by cutting them from common sheet-glass and grinding the edges to the required size. This is the way I have made them so far. They can be blown into a cast-iron mold, the way in which bottles are made. In fact, they can be made by any well-known way in a glass-factory. However, in all cases the cheapest kind of glass will be used in their making.

With glass patterns a boot and shoe cutter can see any flaws or defects in the material to be cut, and, what is of as great importance, the cutter need not be afraid of cutting himself or spoiling the goods by the knife riding the patterns, for the patterns are thick and the glass harder than the edge of the steel knife used in the cutting.

Glass patterns are used in the same way that other patterns are; but with no other patterns can the cutter be as safe from cutting himself and with as little liability of spoiling the goods.

I am aware that photographers use glass patterns in their art to center their pictures for framing. This I distinctly disclaim.

Having thus described my invention, I claim as new and desire to secure by Letters Patent—

Glass patterns in the manufacture of boots, shoes, and gloves, &c., substantially as and for the purpose described, shown, and set forth.

JOHN REES.

Witnesses:
T. G. WILLIAMS,
S. B. SMITH.